US009377558B2

(12) United States Patent
Van Der Zanden et al.

(10) Patent No.: US 9,377,558 B2
(45) Date of Patent: Jun. 28, 2016

(54) SYSTEM COMPRISING A PLURALITY OF OBJECT DETECTION MODULES

(75) Inventors: Henricus Theodorus Van Der Zanden, Sint-Oedenrode (NL); Paulus Thomas Maria Van Zeijl, Veldhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 261 days.

(21) Appl. No.: 13/996,560

(22) PCT Filed: Dec. 8, 2011

(86) PCT No.: PCT/IB2011/055544
§ 371 (c)(1),
(2), (4) Date: Jun. 21, 2013

(87) PCT Pub. No.: WO2012/085729
PCT Pub. Date: Jun. 28, 2012

(65) Prior Publication Data
US 2013/0270424 A1 Oct. 17, 2013

(30) Foreign Application Priority Data

Dec. 21, 2010 (EP) .................................... 10196081

(51) Int. Cl.
*G01V 8/20* (2006.01)
*G01S 13/74* (2006.01)
(Continued)

(52) U.S. Cl.
CPC . *G01V 8/20* (2013.01); *G01S 13/74* (2013.01); *G01S 13/87* (2013.01); *H05B 37/0272* (2013.01)

(58) Field of Classification Search
CPC .......................................................... G01V 8/20

USPC ........................................................ 250/221
See application file for complete search history.

(56) References Cited

U.S. PATENT DOCUMENTS 5,227,762 A * 7/1993 Guidette ................. H04B 3/54
340/12.32
5,400,031 A 3/1995 Fitts
(Continued)

FOREIGN PATENT DOCUMENTS

CN 1721874 A 1/2006
EP 1768086 A1 3/2007
(Continued)

OTHER PUBLICATIONS

Ryoichi Kurata et al, "Evaluation of the Detection Characteristics of Road Sensors under Poor-visibility Conditions", 2004 IEEE Intelligent Vehicles Symposium, University of Parma, Parma, Italy, Jun. 14-17, 2004, pp. 538-543.

(Continued)

*Primary Examiner* — Seung C Sohn
(74) *Attorney, Agent, or Firm* — Meenakshy Chakravorty

(57) ABSTRACT

A system comprises a plurality of object detection modules (SC3, SC4). An object detection module detects an object from a radiation in a particular wavelength range. The system is operable to cause an object detection module (SC4) to operate in a probing master mode (PMM). In this mode, the object detection module (SC3) produces a probing radiation (PR) in the particular wavelength range. Another object detection module (SC3) is caused to operate in a probing slave mode (PSM). In this mode, the other object detection module (SC3) provides an acknowledgment (ACK) in response to receiving the probing radiation (PR).

15 Claims, 3 Drawing Sheets

(51) Int. Cl.
*G01S 13/87* (2006.01)
*H05B 37/02* (2006.01)

(56) References Cited

U.S. PATENT DOCUMENTS

| | | | |
|---|---|---|---|
| 7,088,440 B2* | 8/2006 | Buermann et al. | 356/138 |
| 7,110,100 B2* | 9/2006 | Buermann et al. | 356/138 |
| 7,113,270 B2* | 9/2006 | Buermann et al. | 356/139.03 |
| 8,809,092 B2* | 8/2014 | Linfield et al. | 438/46 |
| 2002/0020816 A1* | 2/2002 | Leen | F21V 17/02 250/342 |
| 2005/0116171 A1* | 6/2005 | Lee | F21S 8/033 250/342 |
| 2008/0211708 A1 | 9/2008 | Haberland et al. | |
| 2009/0033545 A1 | 2/2009 | Pilcher, Jr. | |

FOREIGN PATENT DOCUMENTS

| | | |
|---|---|---|
| GB | 2444734 A | 6/2008 |
| GB | 2470926 A | 12/2010 |
| WO | 2009003279 A1 | 1/2009 |

OTHER PUBLICATIONS

John L. Barker; "Radar, Acoustic, and Magnetic Vehicle Detectors", IEEE Transactions on Vehicular Technology, vol. VT-19, No. 1, Feb. 1970, pp. 30-43.

P. Marchal et al; "Save U: An Innovative Sensor Platform for Vulnerable Road User Protection", Centre Technique De Seloncourt, Jun. 2010, www.save-u.org (2 Pages).

Tons Matthias et al; "Radar Sensors and Sensor Platform Used for Pedestrian Protection in the EC-Funded Project Save-U", Jun. 2010, (6 Pages).

* cited by examiner

SYSTEM COMPRISING A PLURALITY OF OBJECT DETECTION MODULES

FIELD OF THE INVENTION

An aspect of the invention relates to a system that comprises a plurality of object detection modules. The system may be, for example, a lighting system that comprises respective lighting units that are provided with respective object detection modules. The object detection modules may be in the form of, for example, radar detectors. Other aspects of the invention relate to a method of operating a system that comprises a plurality of object detection modules, and a computer program product that enables a processor to carry out such a method.

BACKGROUND OF THE INVENTION

An object detector may detect an object from radiation in a particular wavelength range. For example, the object detector may produce a transmission signal in a radar wavelength range. The transmission signal covers, as it were, a detection area around the object detector. An object that is present in this detection area will cause a reflection of the transmission signal in the radar wavelength range. The object detection module may then detect the object from this reflection, which emanates from the object. As another example, the object detector may detect a relatively warm object, such as, for example, a person, from a radiation that emanates from the object in an infrared wavelength range.

A lighting system may comprise respective lighting units that are provided with respective object detectors. In case an object detector of a lighting unit detects an object, the object detector may cause the lighting unit to be in an active mode. The object detector may also cause a neighboring lighting unit to be in an active mode if, for example, the object is moving towards this neighboring lighting unit. Conversely, in case an object detector of a particular lighting unit does not detect any object, and neighboring object detectors of neighboring lighting units neither detect any object, the particular lighting unit may be in an idle mode. This saves power and reduces so-called light pollution.

In a lighting system as described above, the respective lighting units may further be provided with respective communication modules. Accordingly, a lighting unit may transmit a message to another lighting unit or to a system controller. For example, the message may comprise identification data, data concerning detection of an object, or data concerning a failure within the lighting unit. The respective communication modules further allow the system controller to send data, such as a command, to a particular lighting unit, or a particular group of lighting units.

UK patent application published under number GB 2 444 734 describes a street lighting system that provides illumination for objects passing along a roadway. The presence of objects is detected by one or more sensors, which may be in the form of motion detection radars.

SUMMARY OF THE INVENTION

There is a need for a solution that allows a relatively reliable automated installation and maintenance of a system that comprises a plurality of object detection modules.

In accordance with an aspect of the invention, a system comprises a plurality of object detection modules. An object detection module detects an object from a radiation in a particular wavelength range. The system is operable to cause an object detection module to operate in a probing master mode. In this mode, the object detection module produces a probing radiation in the particular wavelength range. Another object detection module is caused to operate in a probing slave mode. In this mode, the other object detection module provides an acknowledgment in response to receiving the probing radiation.

Such a probing scheme provides a verification of correct functioning of a neighboring object detection module in addition to detecting, or confirming, that the neighboring object detection module is present. That is, the probing scheme serves at least two different purposes. For example, the probing scheme can be used for determining a topology of the lighting system and for failure detection. A topology that is determined by applying this probing scheme indicates only those object detection modules, which are capable of detecting objects from a received radiation. Any dysfunctional object detection module, which does not have this capability, will automatically be omitted from the topology.

An implementation of the invention advantageously comprises one or more of the following additional features, which are described in separate paragraphs. These additional features each contribute to achieving relatively reliable automated installation and maintenance.

The object detection module that operates in the probing master mode is advantageously arranged to concentrate the probing radiation in at least one of a plurality of different directions. The system than advantageously comprises a controlling entity arranged to associate a direction into which the probing radiation is concentrated with an acknowledgment from another object detection module that operates in the probing slave mode. These additional features allow obtaining relatively detailed information for installation and maintenance of the system.

The system is advantageously operable to cause an object detection module that operates in the probing master mode and another object detection module that operate in the probing slave mode to carry out an initial phase. In this initial phase, the object detection module that operates in the probing slave mode produces a presence-indicating radiation. The object detection module that operates in the probing master mode successively concentrates reception sensitivity into respective different directions so as to detect a direction from which the presence-indicating radiation arrives at this object detection module. The object detection module that operates in the probing master mode is than advantageously arranged to subsequently concentrate the probing radiation into this direction. These additional features contribute to automatically and reliably detecting an object detection module that has been newly added to the system. In addition, these features allow efficient probing sessions.

An object detection module that operates in the probing master mode is advantageously arranged to broadcast a signal that causes other object detection modules that receive this signal to operate in the probing slave mode. These additional features further contribute to automatically and reliably detecting an object detection module that has been newly added to the system, and further contribute to efficient probing sessions.

The system advantageously comprises a controlling entity arranged to register an object detection module that operates in the probing master mode and another object detection module that operates in the probing slave mode as neighbors of each other, in case the object detection module that operates in the probing slave mode provides an acknowledgment.

These additional features contribute to obtaining relatively detailed information for installation and maintenance of the system.

The system advantageously comprises a controlling entity arranged to register a malfunction in case an object detection module that operates in the probing master mode and another object detection module that operates in the probing slave mode have been registered as neighbors, and the object detection module that operates in the probing slave mode does not provide any acknowledgment. These additional features contribute to automatically and reliably detecting malfunctions.

The system is advantageously arranged to cause an object detection module to operate in the probing master mode and to cause other object detection modules to operate in the probing slave mode during regular intervals of time. These additional features contribute to detecting malfunctions early.

The system is arranged to cause respective ones of the plurality of object detection modules to operate in the probing master mode during respective intervals of time, and to cause respective other ones of the plurality of object detection modules to operate in the probing slave mode. These additional features contribute to obtaining relatively detailed information for installation and maintenance of the system.

The controlling entity is advantageously arranged to determine a topology of the plurality of object detection modules on the basis of respective acknowledgments that have been reported during the respective intervals of time. This contributes to efficient installation and maintenance of the system.

Respective object detection modules are advantageously associated with respective communication modules. A communication module that is associated with an object detection module can be configured to transfer a message to a neighboring communication module that is associated with a neighboring object detection module as long as the neighboring object detection module provides an acknowledgment in response to a probing radiation from the object detection module. Otherwise, when no acknowledgment has been provided, a message is transferred to another neighboring communication module that is associated with another neighboring object detection module that does provide an acknowledgment in response in a probing radiation of the object detection module. This contributes to reliable communication within the system.

Respective object detection modules advantageously comprise respective radar detectors, whereby a probing radiation is in the form of a radar signal.

Respective object detection modules may form part of respective lighting arrangements.

For the purpose of illustration of the invention, as well as the additional features, a detailed description of particular embodiments is provided with reference to drawings.

DETAILED DESCRIPTION

Figure 1:
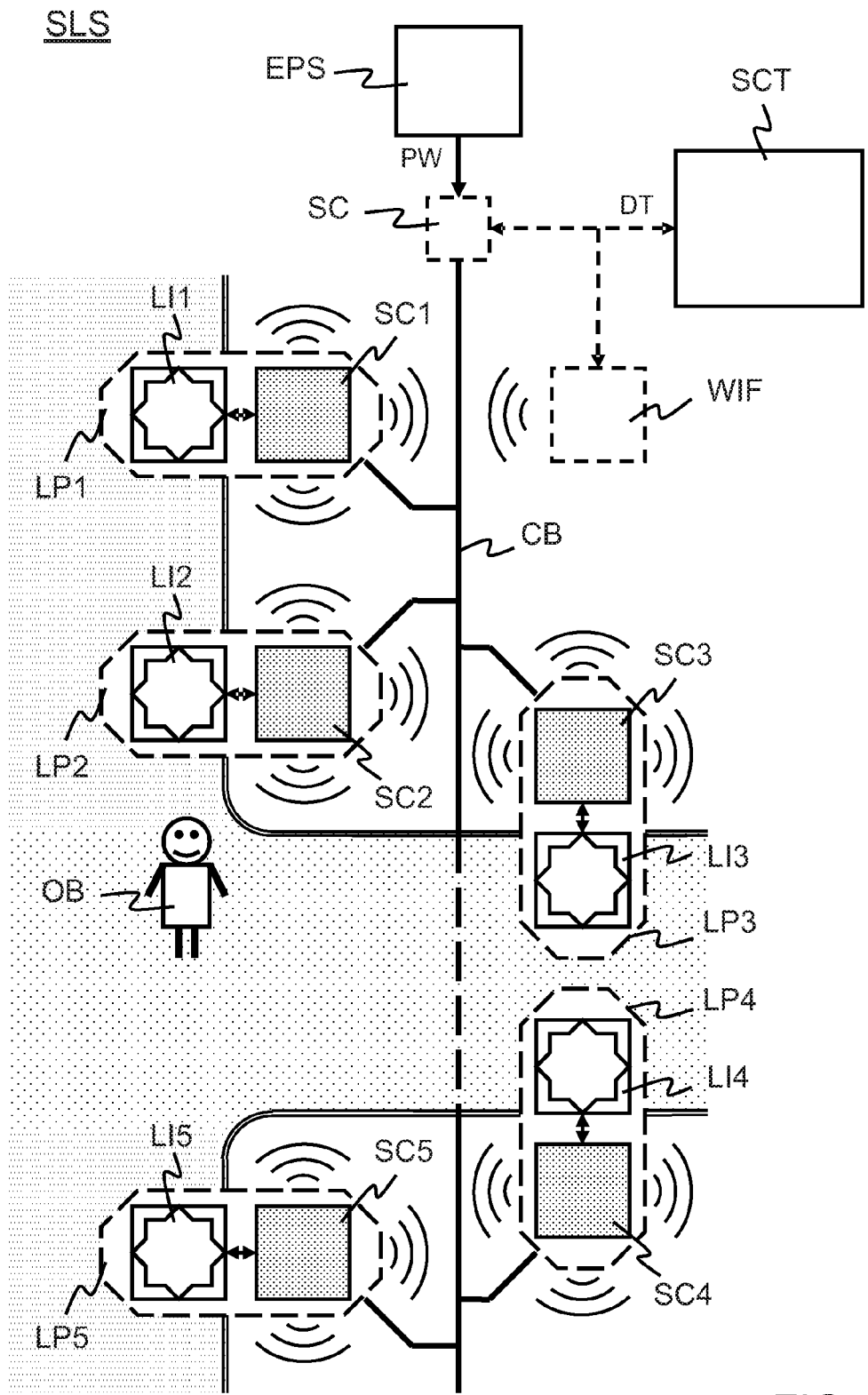
FIG. 1 is a schematic diagram that illustrates a street lighting system comprising a plurality of sensing and communication modules.

FIG. 1 schematically illustrates a street lighting system SLS. The street lighting system SLS comprises a plurality of lampposts LP1-LP5, which are disposed along one or more streets on which an object OB may move. Lamppost LP1 comprises a lighting unit LI1 and a sensing and communication unit SC1. The sensing and communication unit SC1 is preferably integrated in the lighting unit LI1 of the lamppost LP1. There, the sensing and communication is relatively safe from aggressions, in particular vandalism. This equally applies to the other lampposts LP2-LP5 illustrated in FIG. 1, which comprise respective lighting units LI2-LI5 and respective sensing and communication units SC2-SC5.

The street lighting system SLS further comprises an electrical power source EPS and a system controller SCT. A power distribution cable CB electrically couples the lampposts LP1-LP5 to the electrical power source EPS. A wireless communication interface WIF communicatively couples the lampposts LP1-LP5 to the system controller SCT. In another variant of the street lighting system SLS, the power distribution cable CB communicatively couples the lampposts LP1-LP5 to the system controller SCT by means of a splitter combiner SC, which is illustrated by means of broken lines.

The street lighting system SLS basically operates as follows. A sensing and communication unit, which may be any of the sensing and communication units SC1-SC5 illustrated in FIG. 1, may communicate with the system controller SCT and other sensing and communication units, either directly or via the system controller SCT. This system communication can be done in a wired fashion via, for example, the power distribution cable CB. In the latter case, the splitter-combiner SC may superpose, as it were, data from the system controller SCT on an electrical power signal PW, which the electrical power source EPS provides. Conversely, the splitter-combiner SC may extract data that a sensing and communication unit has superposed on the electrical power signal PW.

The system communication may be done in a wireless fashion, preferably in a hopping fashion. Data may hop, as it were, from one sensing and communication unit to another in a chain of sensing and communication units between a sending entity and a destination entity. Such a hopping scheme is relatively power efficient. It is sufficient that a sensing and communication unit has a transmission power for relatively short-range wireless communication that reaches neighboring units only.

For example, let it be assumed that the sensing and communication unit SC4 of lamppost LP4 needs to send a message to the system controller SCT. In that case, sensing and communication units SC4, SC3, SC2, and SC1 may form a chain via which the message can be transferred in a hopping fashion. The sensing and communication unit SC4 of lamppost LP4 first sends the message to the sensing and communication unit SC3 of lamppost LP3. Subsequently, the sensing and communication unit SC3 of lamppost LP3 passes the message to the sensing and communication unit SC2 of lamppost LP2. Subsequently, the sensing and communication unit SC2 of lamppost LP2 passes the message to the sensing and communication unit SC1 of lamppost LP1. Finally, the sensing and communication unit SC1 of lamppost LP1 passes the message to the wireless communication interface WIF, which transfers the message to the system controller SCT. The sensing and communication units SC4, SC5, SC2, and SC1 may form an alternative chain, which can be used in case there is a failure in the sensing and communication unit SC3 of lamppost LP3.

The sensing and communication units SC1-SC5 of the lampposts LP1-LP5 can individually operate in different modes: a standard mode, a probing master mode, and a probing slave mode. These modes will individually be described in greater detail hereinafter. In each of these modes, the sensing and communication unit can preferably communicate with the system controller SCT and sensing and communication units of other lampposts, either directly or via the system controller SCT.

In the standard mode, a sensing and communication unit of a lamppost controls the lighting unit of the lamppost depending on detection of an object. For example, let it be assumed that the sensing and communication unit SC2 of lamppost LP2 detects the object OB that is illustrated in FIG. 1. In that case, the sensing and communication unit SC2 may cause the lighting unit LI2 of lamppost LP2 to operate in an active mode, so that lamppost LP2 produces a given amount of light. Let it further be assumed that the sensing and communication unit SC2 of lamppost LP2 detects that the object is moving towards lamppost LP5. In that case, the sensing and communication unit SC2 may inform the sensing and communication unit SC5 of lamppost LP5 of this fact. In response, the sensing and communication unit SC5 of lamppost LP5 may cause the lighting unit LI5 of this lamppost to operate in an active mode. In this example, lighting control is carried out locally. However, lighting control may also be carried out in a centralized fashion via the system controller SCT.

In general, a sensing and communication unit, which may be any of the sensing and communication units SC1-SC5 illustrated in FIG. 1, detects an object from radiation in a particular wavelength range. For example, the sensing and communication unit may produce a radar radiation that covers, as it were, a detection area around the lamppost of which this unit forms part. An object that is present in this detection area will cause a reflection of this radar radiation. The sensing and communication unit may then detect the object from this reflection, which emanates from the object in a radar wavelength range. As another example, the sensing and communication unit may detect a relatively warm object from radiation in an infrared wavelength range, which emanates from the object.

In the probing master mode, a sensing and communication unit produces a probing radiation in the particular wavelength range of radiation from which an object is detected. The sensing and communication unit transmits the probing radiation such that sensing and communication units of relatively nearby lampposts may receive the probing radiation. That is, the sensing and communication units of a relatively nearby lamppost should normally receive the probing radiation. The term "relatively nearby" refers to a typical distance range between two neighboring lampposts. This typical distance range may vary from one application to another depending on, for example, a typical light intensity that a lamppost can provide, or a typical height of a lamppost, or both.

In the probing slave mode, a sensing and communication unit that receives a probing radiation from another sensing and communication unit, which operates in a probing master mode, provides an acknowledgment. The sensing and communication unit that receives the probing radiation may send this acknowledgment to the sensing and communication unit that operates in the probing master mode. The latter unit may then send a message to the system controller SCT, which reports this acknowledgment. Alternatively, the sensing and communication unit that receives the probing radiation may send the acknowledgment directly to the system controller SCT. In any case, the acknowledgment indicates that the sensing and communication unit, which provides the acknowledgment, as well as the lamppost that comprises this unit, are present in the street lighting system SLS. Moreover, the acknowledgment confirms that the sensing and communication unit is capable of detecting an object from a radiation in the particular wavelength concerned. The acknowledgment may therefore serve at least one of the various different purposes, such as, for example, presence detection, presents confirmation, and failure detection.

A sensing and communication unit preferably operates in the probing master mode during regular intervals of time. This contributes to achieving reliable automated failure detection. For example, a sensing and communication unit may operate in the probing master mode at least once a day when daylight is present and no lighting is needed. The system controller SCT may cause a sensing and communication unit to regularly operate in the probing master mode. Alternatively, a sensing and communication unit may regularly operate in the probing master mode on its own initiative. In that case, the sensing and communication unit preferably coordinates with other sensing and communication units, in particular neighboring ones, before entering in the probing master mode. The sensing and communication unit may also coordinate with the system controller SCT, if present.

In case a sensing and communication unit of a lamppost operates in the probing master mode, the sensing and communication units of neighboring lampposts should preferably operate in the probing slave mode. A sensing and communication unit of a lamppost that has been newly added to the system should preferably also operate in the probing slave mode. For example, a sensing and communication unit that operates in the probing master mode may, in an initial phase of this mode, broadcast a signal that causes neighboring sensing and communication units to operate in a probing slave mode. As another example, the system controller SCT may cause the aforementioned sensing and communication units to operate in the probing slave mode.

The system controller SCT may cause respective sensing and communication units of respective lampposts to successively operate in the probing master mode. That is, the respective sensing and communication units are made to operate in the probing master mode one after the other, during respective intervals of time. This can also be achieved without the system controller SCT. The respective sensing and communication units may autonomously cause one of these to operate in the probing master mode in a coordinated fashion. Both approaches achieve that, in the street lighting system SLS, respective clusters of sensing and communication units are successively designated to operate in a probing mode. In such a cluster, one sensing and communication unit operates in the probing master mode command, whereas the other sensing and communication units of the cluster operate in the probing slave mode.

Figure 2:
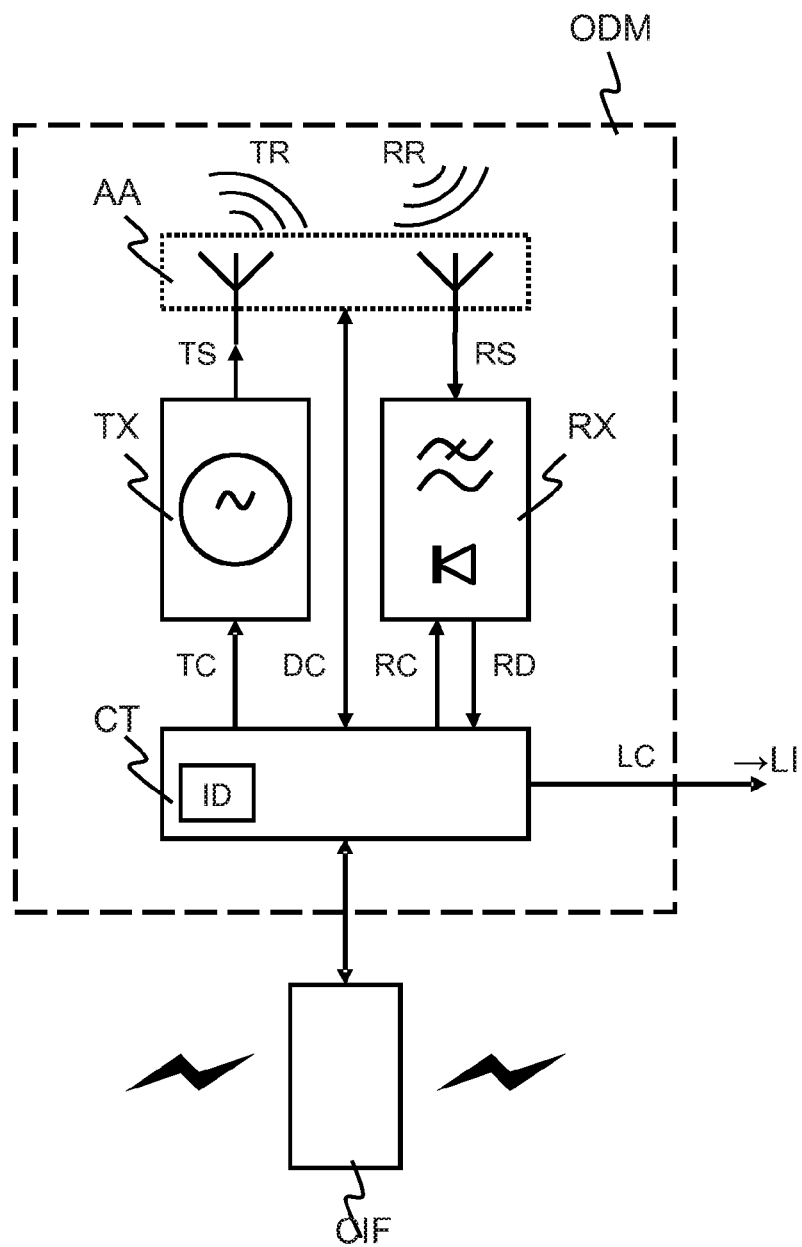
FIG. 2 is a block diagram that illustrates a sensing and communication module.

FIG. 2 schematically illustrates a sensing and communication unit SC, which can be regarded as representative of the sensing and communication units illustrated in FIG. 1. The sensing and communication unit SC illustrated in FIG. 2 can thus be comprised in any of the lampposts LP1-LP5. The sensing and communication unit SC comprises an antenna arrangement AA, a radar transmitter TX, a radar receiver RX, and a controller CT. The aforementioned entities jointly form part of an object detection module ODM. The radar transmitter TX and radar receiver RX jointly constitute a radar detector.

The sensing and communication unit SC further comprises a communication interface CIF. The communication interface CIF communicatively couples the controller CT to the system controller SCT as well as controllers of other sensing and communication units of other lampposts. The communication interface CIF may comprise a transceiver for wireless communication. The communication interface CIF may operate in accordance with a short-range wireless communication protocol, such as, for example, Bluetooth or Zigbee. Alternatively, the communication interface CIF unit may comprise a splitter combiner for a wired communication via the power distribution cable CB illustrated in FIG. 1. The splitter combiner may be similar to the splitter combiner SC illustrated in FIG. 1.

In more detail, the controller CT may be in the form of a processor that comprises an instruction-executing arrangement and a set of instructions that causes the controller CT to carry out various operations, which will be described hereinafter. The controller CT may comprise identification data ID, which uniquely identifies the object detection module ODM, as well as the lamppost with which this module is associated. The controller CT is communicatively coupled to the lighting unit LI that forms part of the same lamppost as the sensing and communication unit SC. To that end, the sensing and communication unit SC may comprise a control interface, which is not represented in FIG. 2 for reasons of simplicity.

The antenna arrangement AA is preferably of a directional type. In that case, the antenna arrangement AA may comprise a plurality of antennas coupled to a beam forming circuit, which may be complemented with a beam steering circuit. The beam forming circuit will typically comprise a bank of phase shifters, or a bank of delay lines, or both. The beam forming circuit may further comprise a bank of amplifiers coupled to the bank of phase shifters, or the bank of delay lines, whichever of those two is present in the beam forming circuit. The beam forming circuit may be configured to operate in a transmission mode as well as a reception mode. To that end, the beam forming circuit may comprise transmission amplifiers and reception amplifiers.

The sensing and communication unit SC basically operates as follows. The radar transmitter TX generates a radar transmission signal TS, which has a given frequency in a radar wavelength range. The controller CT may control this frequency, which will be referred to as radar transmission frequency hereinafter. To that end, the controller CT applies transmission control data TC to the radar transmitter TX, which defines the radar transmission frequency. The controller CT may define other transmission parameters by means of the transmission control data TC. For example, the controller CT may define a particular type of modulation of the radar transmission signal TS, such as, for example a pulse modulation and a saw-tooth shaped frequency modulation. As another example, the controller CT may define a transmission power. In case the antenna arrangement AA comprises transmission amplifiers, the transmission control data TC will then also apply to the antenna arrangement AA.

The antenna arrangement AA produces a transmitted radar radiation TR in response to the radar transmission signal TS. In case the antenna arrangement AA is of the directional type, the antenna arrangement AA can concentrate the transmitted radar radiation TR in a particular direction. The controller CT may determine this particular direction by applying direction control data DC to the antenna arrangement AA. The direction control data DC, which the controller CT provides, thus defines a particular directional antenna pattern. The beam steering circuit may effectively translate the direction control data DC into a set of control signals for the beam forming circuit, assuming these circuits are present in the antenna arrangement AA. The direction control data DC may also define an omnidirectional antenna pattern. The controller CT may thus cause the transmitted radar radiation TR to be omnidirectional.

The antenna arrangement AA may receive a radar radiation RR from, for example, an object that is sufficiently close to the object detection module ODM. This received radar radiation RR then emanates from the object as a reflection of the transmitted radar radiation TR. In any case, the antenna arrangement AA provides a reception signal RS that comprises a component that is characteristic of a received radar radiation RR, if present. This component will be referred to as received radar signal component hereinafter. The received radar signal component has a frequency in the radar wavelength range. This frequency will be referred to as received radar frequency hereinafter. In case the received radar radiation RR is a reflection of the transmitted radar radiation TR, the received radar frequency will be relatively close to the radar transmission frequency. The received radar frequency may then even be identical to the radar transmission frequency in case the object that causes the reflection is stationary with respect to the object detection module ODM.

The radar receiver RX processes the reception signal RS so as to detect whether the reception signal RS comprises a received radar signal component, or not. In addition, the radar receiver RX may determine one or more parameters of the received radar signal component, such as, for example, amplitude and frequency. More specifically, the radar receiver RX may determine a frequency difference between the received radar frequency and the radar transmission frequency. The radar receiver RX provides radar detection data RD to the controller CT, which indicates whether a radar signal component is present, or not. The radar detection data RD may optionally comprise indications relating to one or more parameters of the radar signal component, if present.

The controller CT may define one or more reception parameters. To that end, the controller CT may apply reception control data RC to the radar receiver RX. For example, the controller CT may define a reception frequency band, which may be characterized in terms of reception frequency and reception bandwidth. The controller CT may define further reception parameters by means of the reception control data RC. For example, the controller CT may define one or more thresholds for detecting the radar signal component. The radar receiver RX may apply respective thresholds to respective ranges of frequency differences that may exist between the received radar frequency and the radar transmission frequency.

The object detection module ODM may determine a direction from which the received radar radiation RR emanates. To that end, the antenna arrangement AA may provide a directional antenna pattern in reception mode so that reception sensitivity is concentrated in a particular direction. As mentioned hereinbefore, the direction control data DC, which the controller CT provides, defines the directional antenna pattern and thus defines the particular direction in which reception sensitivity is concentrated. The controller CT may cause the antenna arrangement AA to successively concentrate reception sensitivity in various different directions. The controller CT may check, for any given direction, whether the radar detection data RD indicates that a received radar signal component is present, or not. In case this check is positive, the controller CT can determine that the received radar radiation RR emanates from the direction concerned. This process will be referred to as a reception direction scan hereinafter.

The controller CT determines a particular mode in which the sensing and communication unit SC should operate. This may be the standard mode, the probing master mode, or the probing slave mode. The controller CT determines the particular mode of operation on the basis of messages, which the controller CT receives or transmits, or both, via the communication interface CIF. For example, the controller CT may receive a message from the system controller SCT, which requests operation in the probing master mode. Alternatively, the controller CT may take initiative and exchange messages with other sensing and communication units so as to verify whether operation in the probing master mode is possible. As another example, the controller CT may receive a message, which requests operation in the probing slave mode. Such a message may emanate from another sensing and communication unit SC that operates in the probing master mode. Alternatively, a message may emanate from the system controller SCT.

In the standard mode, the controller CT applies settings and carries out operations that are directed to object detection. For example, the controller CT may set the radar transmission frequency of the sensing and communication unit SC so that this frequency is different from other radar transmission frequencies of other, neighboring sensing and communication units. This avoids mutual interference and erroneous object detection that may result therefrom. The controller CT may set the reception frequency band of the radar receiver RX so that this band only passes a particular range of frequency differences between the received radar frequency and the radar transmission frequency. This particular range effectively defines a particular speed range for objects that are to be detected.

In the standard mode, the controller CT carries out a lighting control on the basis of the radar detection data RD that the data receiver provides. In case the radar detection data RD indicates that a received radar signal component is present, the controller CT concludes, as it were, that an object is nearby the lamppost of which the sensing and communication unit SC forms part. The controller CT will then typically cause the lighting unit of the lamppost to operate in an active mode. To that end, the controller CT may apply lighting control data LC to the lighting unit LI.

In the standard mode, the sensing and communication unit SC may carry out directional object detection. To that end, the controller CT may cause the object detection module ODM to carry out a reception direction scan as described hereinbefore. Instead of this or in addition thereto, the controller CT may cause the object detection module ODM to successively concentrate the transmitted radar radiation TR in the various different directions. As explained hereinbefore, the controller CT may do so by means of the direction control data DC. This may result in respective transmission time slots in which the transmitted radar radiation TR is concentrated in respective directions. The controller CT may check, for any given direction, whether the radar detection data RD indicates that a received radar signal component is present, or not. In case this check is positive, the controller CT can determine that an object is present in the direction concerned. The controller CT may send information about the direction in which the object is located to another controller that resides within another lamppost, which is located in this direction. The other controller may use this direction information, which is preferably accompanied with information about the speed of the object, for controlling the lighting unit in the other lamppost.

In the probing master mode, the controller CT applies settings and carries out operations that are directed to producing the transmitted radar radiation TR so that neighboring lampposts can receive this radiation. That is, in the probing master mode, the transmitted radar radiation TR constitutes a probing radiation that neighboring lampposts should normally receive and detect. To that end, the controller CT may set the radar transmitter TX and, if needed, the antenna arrangement AA, so that the probing radiation is sufficiently powerful. The controller CT should preferably ensure that the frequency of the probing radiation falls within the reception frequency band of the radar receiver in a neighboring lamppost. This can be achieved in various manners.

For example, in the street lighting system SLS, a frequency can be specifically reserved for probing. In that case, the controller CT controls the radar transmitter TX so that the probing radiation has this specific probing frequency. The object detection module ODM of a neighboring lamppost also tunes its reception frequency band to the specific probing frequency. As another example, the controller CT may maintain the radar transmission frequency that is used in the standard mode. In that case, the object detection module ODM of a neighboring lamppost should tune its reception frequency band to this radar transmission frequency. As yet another example, the object detection module ODM of a neighboring lamppost may maintain the reception frequency band that is used in the standard mode. In that case, the controller CT should control the radar transmitter TX so that the frequency of the probing radiation falls within this reception frequency band.

In the latter two examples, the system controller SCT may provide information concerning respective frequencies that respective object detection modules use, or this information can be obtained by exchanges of messages between sensing and communication units. As yet another example, all object detection modules in the street lighting system SLS may be synchronized to operate at the same frequency irrespective of their operating modes. However, such an implementation may suffer from mutual interference due to phase noise.

Probing is preferably done in a directional fashion, similar to directional object detection. In case directional probing is applied, the controller CT causes the antenna arrangement AA to successively concentrate the probing radiation in the various different directions. The controller CT may do so by means of the direction control data DC. This will typically result in respective probing time slots in which the probing radiation is concentrated in respective directions. That is, in a particular probing time slot, the probing radiation is concentrated in a particular direction.

The controller CT may check for reception of acknowledgments while probing. A sensing and communication unit that operates in the probing slave mode will provide an acknowledgment in response to reception of the probing radiation. For example, the controller CT may instantaneously receive the acknowledgment via the communication interface CIF. The acknowledgment preferably comprises identification data of the sensing and communication unit that provides the acknowledgment. In case the probing is directional, the controller CT can associate the acknowledgment, as well as the identification data included therein, with the direction into which the probing radiation is concentrated.

At the end of the probing master mode, the controller CT has effectively established a list of neighboring sensing and communication units that have provided acknowledgments. This list will be referred to as probing result list hereinafter. In case the probing has been directional, the probing result list preferably indicates a direction that is associated with an acknowledgment. This is the direction in which the neighboring sensing and communication that has provided the acknowledgment is located. The controller CT may store the probing result list. The controller CT may also send the probing result list to the system controller SCT via the communication interface CIF. The controller CT may determine a topology of the street lighting system SLS, or a local portion thereof, in case respective other sensing and communication units have communicated their respective probing result.

In the probing slave mode, the controller CT applies settings and carries out operations that are directed to receiving a probing radiation and providing an acknowledgment in response to this reception. The controller CT disables the radar transmitter TX while a neighboring sensing and communication unit, which operates in the probing master mode, produces the probing radiation. Accordingly, the radar radiation RR that is received as illustrated in FIG. 2 should then normally be the probing radiation. The controller CT sets the radar receiver RX so that its reception frequency band is tuned to the frequency of the probing radiation. This frequency may be, for example, a specific probing frequency as mentioned hereinbefore.

The controller CT may cause the reception frequency band to be relatively narrow. The reception frequency band can be relatively narrow if, for example, there is a form of frequency synchronization between respective object detection modules in the street lighting system SLS. Since lampposts are typically stationary, there is no Doppler frequency shift to be accounted for, contrary to the standard mode where the reception frequency band should preferably account for such shifts. By making the reception frequency band relatively narrow in the probing slave mode, reception sensitivity is increased. This allows for a relatively large probing distance for a given power of the probing radiation or, conversely, allows for a relatively modest power of the probing radiation for a given probing distance.

The controller CT may cause the antenna arrangement AA to have an omnidirectional antenna pattern for receiving the probing radiation. In that case, reception sensitivity is substantially evenly distributed among all directions. The controller CT may also cause the antenna arrangement AA to carry out a reception direction scan, which can contribute to achieving a relatively large probing distance. In that case, the controller CT may cause the antenna arrangement AA to successively concentrate reception sensitivity in different directions. Such a reception direction scan should preferably be sufficiently fast if the sensing and communication unit that operates in the probing master mode, probes in a directional fashion as described hereinbefore. In that case, the reception direction scan should preferably be carried out within a typical duration of a probing time slot, during which the aforementioned unit concentrates the probing radiation in a particular direction.

The controller CT may also cause the antenna arrangement AA to have a substantially fixed directional antenna pattern. In that case, reception sensitivity can be concentrated in a particular direction, or a few particular directions, from which the probing radiation is expected to arrive. The controller CT may determine such an expected direction on the basis of, for example, probing results from previous probing sessions. Alternatively, or in addition thereto, the controller CT may use information that the sensing and communication unit that operates in the probing master mode has communicated in an initial phase. Such information may include the identification data ID of this unit, as well as directional information that this unit has established prior to producing the probing radiation. The system controller SCT may also provide such information.

As explained hereinbefore, the radar detection data RD, which the radar receiver RX provides, may indicate that a received radar signal component is present. In the probing slave mode, this typically indicates reception of the probing radiation. The controller CT will provide an acknowledgment in response to such an indication. The controller CT preferably includes the identification data ID in the acknowledgment. The controller CT may instantaneously send the acknowledgment to the sensing and communication unit SC that operates in the probing master mode via the communication interface CIF. Alternatively, or in addition thereto, the controller CT may send the acknowledgment to the system controller SCT via the communication interface CIF. The acknowledgement may be provided with some delay, after probing.

Figure 3:
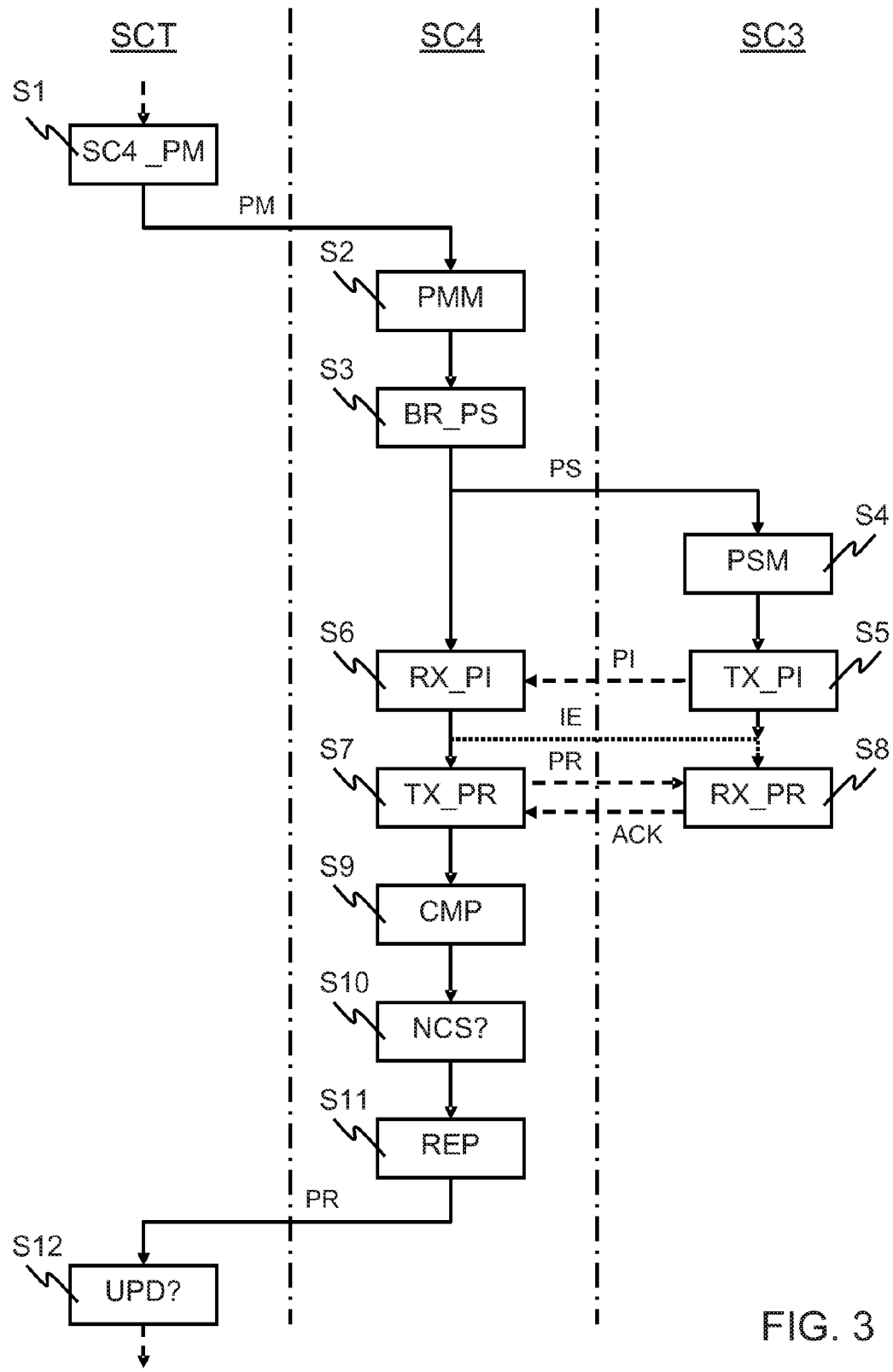
FIG. 3 is a flowchart diagram that illustrates a probing session in a method of operating the street lighting system.

FIG. 3 illustrates a probing session in a method of operating the street lighting system SLS illustrated in FIG. 1. The probing session comprises a series of steps S1-S12 that involve the system controller SCT, the sensing and communication unit SC4 of lamppost LP4, and the sensing and communication unit SC3 of lamppost LP3. FIG. 3 is divided into three vertical portions. A left-hand portion illustrates various steps that the system controller SCT carries out. A middle portion illustrates various steps that the sensing and communication unit SC4 of lamppost LP4 carries out. A right-hand portion illustrates various steps that the sensing and communication unit SC3 of lamppost LP3 carries out.

The left-hand portion of FIG. 3 may thus be regarded as a flowchart representation of a set of instructions, which enables the system controller SCT to carry out various operations described hereinafter with reference to FIG. 3. Likewise, the middle portion and the right-hand portion of FIG. 3 may be regarded as flowchart representations of sets of instructions, which enable the sensing and communication unit SC4 of lamppost LP4 and the sensing and communication unit SC3 of lamppost LP3, respectively, to carry out various operations described hereinafter with reference to FIG. 3. The aforementioned units are assumed to operate in the standard mode when the probing session illustrated in FIG. 3 starts. It is further assumed that the system controller SCT has already determined a topology of the street lighting system SLS, as mentioned hereinbefore.

In step S1 (SC4_PM), the system controller SCT sends a probing master mode setting message PM to the sensing and communication unit SC4 of lamppost LP4. The probing master mode setting message PM commands this unit SC4 to operate in the probing master mode. The probing master mode setting message PM may also be in the form of a request for such operation. In that case, the system controller SCT will typically expect a return message confirming operation in the probing master mode.

In step S2 (PMM), the sensing and communication unit SC4 of lamppost LP4 switches from operating in the standard mode to operating in the probing master mode PMM upon reception of the probing master mode setting message PM from the system controller SCT. In the probing master mode, the controller CT of the sensing and communication unit SC4 applies initial settings and carries out initial operations, which precede the settings and operations described hereinbefore with reference to FIG. 2. That is, the probing master mode comprises an initial phase, which will be described hereinafter.

In step S3 (BR_PS), which forms part of the initial phase of the probing master mode, the sensing and communication unit SC4 broadcasts a probing slave setting message PS. The probing slave setting message PS commands other sensing and communication units that receive this message to operate in the probing slave mode. The probing slave setting message PS may also be in the form of a request. The sensing and communication unit SC4 preferably broadcasts the probing slave setting message PS by means of its communication interface CIF. Referring to FIG. 1, it is assumed that the sensing and communication units SC3 and SC5 of lampposts LP3 and LP5, respectively, receive the probing slave setting message PS. In what follows, steps are described that the sensing and communication unit SC3 carries out. The sensing and communication unit SC5 may thus also carry out these steps.

In step S4 (PSM), the sensing and communication unit SC3 of lamppost LP3 switches from operating in the standard mode to operating in the probing slave mode PSM upon reception of the probing slave setting message PS from the sensing and communication unit SC3, which operates in the probing master mode. In the probing slave mode, the controller CT of the sensing and communication unit SC3 applies initial settings and carries out initial operations, which precede the settings and operations described hereinbefore with reference to FIG. 2. That is, the probing slave mode also comprises an initial phase that is complementary with that of the probing master mode, In step S5 (TX_PI), which forms part of the initial phase of the probing slave mode, the sensing and communication unit SC3 produces a transmitted radar radiation that is intended for the sensing and communication unit SC4, which operates in the probing master mode. The transmitted radar radiation provides a presence indication for the latter unit and will therefore be referred to as presence-indicating radiation PI hereinafter. The presence-indicating radiation PI may have a frequency that is the same as that of the probing radiation, which has been described hereinbefore. The presence-indicating radiation PI may be omnidirectional or, which is preferred, may be concentrated in the direction of the sensing and communication unit SC4. The sensing and communication unit SC3 may know this direction from a previous probing session. It is also possible for the system controller SCT or the sensing and communication unit SC4 to provide the sensing and communication unit SC3 an indication of this direction.

In step S6 (RX_PI), which forms part of the initial phase of the probing master mode, the sensing and communication unit SC4 of lamppost LP4 carries out a reception direction scan. The radar transmitter TX is disabled during the reception direction scan. The radar receiver RX is operational and is tuned to receive a presence-indicating radiation PI of a neighboring sensing and communication unit. The sensing and communication unit SC4 successively concentrates reception sensitivity in different directions. Referring to FIG. 2, the radar detection data RD may indicate that a received radar signal component is present for a particular direction. This indicates that a neighboring sensing and communication unit, which produces a presence-indicating radiation PI, is present in this particular direction. Steps S5 and S6 are thus carried out concomitantly.

Once the reception direction scan is completed, the sensing and communication unit SC4 has effectively a list of respective directions in which respective neighboring sensing and communication units are located. This completes the initial phase of the probing master mode. The sensing and communication unit SC4 may then send an initial phase ending message IE to the respective sensing and communication units signaling that the initial phase of the probing slave mode should also be completed. Alternatively, the sensing and communication units that operate in the probing slave mode may autonomously complete the initial phase as result of, for example, expiry of a given time interval that has been assigned to the initial phase.

In step S7 (TX_PR), the sensing and communication unit SC4 of lamppost LP4, which operates in the probing master mode, produces the probing radiation PR whereby this radiation is successively concentrated in the respective directions that have been determined in the preceding step S6. The probing radiation PR is thus successively directed towards the respective neighboring communication units from which the presence-indicating radiation PI has been received in the initial phase.

For the rest, the sensing and communication unit SC4 operates in a manner that has been described hereinbefore with reference to FIG. 2 regarding the probing master mode. The sensing and communication unit SC4 thus expects an acknowledgment of a neighboring sensing and communication unit towards which the probing radiation PR is directed. Step S7 thus results in a probing result list as described hereinbefore with reference to FIG. 2. The probing result list identifies neighboring sensing and communication units, as well as the respective directions in which these units are located.

In step S8 (RX_PR), the sensing and communication unit SC3 of lamppost LP3 operates in the probing slave mode in a manner that has been described hereinbefore with reference to FIG. 2. The sensing and communication unit SC3 thus provides an acknowledgment ACK upon reception of the probing radiation PR from sensing and communication unit SC4 of lamppost LP4. In case the sensing and communication unit SC3 fails to receive or detect the probing radiation PR, this unit does not provide any acknowledgment. Steps S7 are S8 thus carried out concomitantly.

In step S9, (CMP) the sensing and communication unit SC4 of lamppost LP4, which operates in the probing master node, compares the probing result list with a previous probing result list from a previous probing session, if any. The controller CT illustrated in FIG. 2 may carry out this comparison. Accordingly, the controller CT can identify one or more new sensing and communication units, if any, and one or more missing sensing and communication units, if any. A new sensing and communication unit typically indicates a new lamppost that has been added to the street lighting system SLS, or a lamppost that has been repaired. A missing sensing and communication unit typically indicates a failure, or a lamppost that has been removed from the street lighting system SLS.

In the street lighting system SLS, supplementary data may be available concerning addition and removal of lampposts. In that case, it is possible to draw definite conclusions from new and missing lampposts that are identified by probing result list comparisons. Initially, when the street lighting system SLS has just been installed, the probing result list from a first, initial probing session indicates all functional neighboring sensing and communication units.

In step S10 (NCS?), the sensing and communication unit SC4 of lamppost LP4, which has operated in the probing master mode, evaluates whether a new communication scheme should be implemented, or not, on the basis of the probing result list. The controller CT illustrated in FIG. 2 may carry out this evaluation and implement a new communication scheme if needed. For example, referring to FIG. 2, let it be assumed that the controller CT has configured the communication interface CIF to transfer a message, which is addressed to the system controller SCT, to the sensing and communication unit SC3 of lamppost LP3. This communication scheme is maintained as long as the last-mentioned sensing and communication unit SC3 provides an acknowledgment during probing sessions where the sensing and communication unit SC4 operates in the probing master mode.

However, in case the sensing and communication unit SC3 of lamppost LP3 does not provide any acknowledgment, the controller CT of the sensing and communication unit SC4 lamppost LP4 will implement a new communication scheme as a precautionary measure. For example, referring to FIG. 1, the new communication scheme may provide that the communication interface CIF of the sensing and communication unit SC4 of lamppost LP4 should transfer a message, which is addressed to the system controller SCT, to the sensing and communication unit SC5 of lamppost LP5. This is subject to the condition that the latter unit SC5 has provided an acknowledgment during the probing session. The new communication scheme entails a new hopping path for messages that emanate from the sensing and communication unit SC4, or that pass via this unit.

In step S11 (REP), the sensing and communication unit SC4 of lamppost LP4, which operates in the probing master node, sends a probing report PR to the system controller SCT. The probing report PR may comprise the probing result list. The probing report PR may further comprise other information related to the probing session that has taken place, such as, for example, a change in communication scheme. In case the probing result list is identical to the probing result list of the immediately preceding probing session, the probing report PR may comprise an indication of the same. This indication effectively constitutes a reference to a previous probing result list that has already been communicated. In general, following a communication of an initial probing result list, it is sufficient that the probing report PR identifies any changes to the system controller SCT.

In step S12 (UPD?), the system controller SCT evaluates whether the topology of the street lighting system SLS should be updated, or not, on the basis of the probing report PR. In case the probing report PR indicates a change, the system controller SCT adapts the topology to incorporate this change.

Initially, when the street lighting system SLS has just been installed, the system controller SCT determines an initial topology on the basis of respective initial probing reports from respective sensing and communication units. These initial probing reports will then typically include the respective probing result lists from the respective sensing and communication units. An initial probing report, which emanates from a sensing and communication unit that has first operated in the probing master mode, indicates the neighboring sensing and communication units. The initial probing report may further indicate the respective directions in which these neighboring units are located with respect to the sensing and communication unit that provides this report. The latter assumes that probing is done in a directional fashion as described hereinbefore.

FINAL REMARKS

The detailed description hereinbefore with reference to the drawings is merely an illustration of the invention and the additional features, which are defined in the claims. The invention can be implemented in numerous different ways. In order to illustrate this, some alternatives are briefly indicated.

The invention may be applied to advantage in numerous types of systems or methods involving a plurality of object detection modules. Street lighting is merely an example. As another example, the invention may be applied to advantage in an interior lighting system. As yet another example, the invention may be applied to advantage in an alarm system that comprises a plurality of object detection modules.

There are various different ways of detecting an object from a radiation. Object detection by means of transmission and reception of radar radiation is merely an example. As another example, object detection may be based on transmission and reception of ultrasound radiation. As yet another example, object detection may be based on reception of infrared radiation only. The term "object detection module" should therefore be understood in a broad sense. The term embraces any entity capable of detecting an object from a received radiation, which emanates from the object.

Probing need not necessarily be carried out a directional fashion, although this is advantageous. A probing radiation may be omnidirectional, and the probing radiation may be received with omnidirectional sensitivity. In that case, the probing may provide neighbor identification only. This can be sufficient for determining a basic topology and for failure detection. In such an omnidirectional implementation, respective object detection modules that concomitantly operate in the probing slave mode may be assigned respective timeslots for providing an acknowledgment. This can avoid collisions between acknowledgments.

A system in accordance with the invention need not necessarily comprise a system controller. Object detection modules may collectively implement system control actions, such as, for example, probing; in a coordinated fashion. For example, a coordination protocol may prevent object detection modules, which are relatively close, from simultaneously operating in the probing master mode. Furthermore, the object detection modules may communicate with each other in accordance with a Media Access Control (MAC) protocol. An object detection module may broadcast a probing result to the other object detection modules that form part of a same system. An object detection module may then locally determine a topology of the system, including failure information.

A system in accordance with the invention need not necessarily comprise an electrical power source and a power distribution cable. For example, each lamppost may be powered individually by means of, for example, a solar panel, which may be complemented with a battery. In such an implementation, the lampposts will typically communicate with each other in a wireless fashion.

A system in accordance with the invention need not necessarily comprise object detection modules that are provided with communication modules, although this can be advantageous. An object detection module may communicate with another object detection module by using the probing radiation, or a similar radiation, as a carrier for transmitting data. In this regard, it should be noted that an acknowledgement need not be provided instantaneously, or during a probing session. An acknowledgement may be provided once a probing session has been completed.

In general, there are numerous different ways of implementing the invention, whereby different implementations may have different topologies. In any given topology, a single module may carry out several functions, or several modules may jointly carry out a single function. In this respect, the drawings are very diagrammatic. For example, referring to FIG. 2, the controller CT and at least a portion of the communication interface CIF may form part of a single integrated circuit module.

There are numerous functions that may be implemented by means of hardware or software, or a combination of both. A description of a software-based implementation does not exclude a hardware-based implementation, and vice versa. Hybrid implementations, which comprise one or more dedicated circuits as well as one or more suitably programmed processors, are also possible. For example, various functions described hereinbefore with reference to the figures may be implemented by means of one or more dedicated circuits, whereby a particular circuit topology defines a particular function.

The remarks made hereinbefore demonstrate that the detailed description with reference to the drawings is an illustration of the invention rather than a limitation. The invention can be implemented in numerous alternative ways that are within the scope of the appended claims. All changes that come within the meaning and range of equivalency of the claims are to be embraced within their scope. Any reference sign in a claim should not be construed as limiting the claim. The word "comprising" does not exclude the presence of other elements or steps than those listed in a claim. The word "a" or "an" preceding an element or step does not exclude the presence of a plurality of such elements or steps. The mere fact that respective dependent claims define respective additional features, does not exclude combinations of additional features other than those reflected in the claims.

The invention claimed is:

1. A system (SLS) comprising a plurality of object detection modules, at least a first object detection module (ODM) of the plurality of object detection modules being arranged to operate in a standard mode in which the first object detection module can detect an object from a radiation (RR) in a particular wavelength range and carry out a control depending on detection of the object, the system being operable to cause the first object detection module to operate in a probing master mode (PMM) in which the first object detection module produces a probing radiation (PR) in the particular wavelength range, and to cause at least a second object detection module to operate in a probing slave mode (PSM) in which the second object detection module provides an acknowledgment (ACK) in response to receiving the probing radiation, wherein the first object detection module (ODM) that operates in the probing master mode (PMM) is configured to associate identification data of said second object detection module with a given direction in which said second object detection module is disposed based on said acknowledgement.

2. The system according to claim 1, wherein the first object detection module (ODM) that operates in the probing master mode (PMM) is arranged to concentrate the probing radiation (PR) in at least one of a plurality of different directions including said given direction, the system comprising a controlling entity (CT) arranged to associate the given direction into which the probing radiation is concentrated with said acknowledgment (ACK).

3. The system according to claim 1, wherein the system is operable to cause the first object detection module (ODM) that operates in the probing master mode (PMM) and the second object detection module that operates in the probing slave mode (PSM) to carry out an initial phase (S3-S6) in which the second object detection module that operates in the probing slave mode produces a presence-indicating radiation (PI) and the first object detection module that operates in the probing master mode (PMM) successively concentrates reception sensitivity into respective different directions including said given direction so as to detect the given direction from which the presence-indicating radiation arrives at the first object detection module, the first object detection module that operates in the probing master mode being arranged to subsequently concentrate the probing radiation (PR) into the given direction.

4. The system according to claim 1, wherein the first object detection module that operates in the probing master mode (PMM) is arranged to broadcast a signal (PS) that causes other object detection modules, including said second object detection module, of the plurality of object detection modules that receive the signal to operate in the probing slave mode (PSM).

5. The system according to claim 1, wherein the system comprises a controlling entity (SCT) arranged to register the first object detection module (ODM) that operates in the probing master mode (PMM) and the second object detection module that operates in the probing slave mode (PSM) as neighbors, in case the second object detection module that operates in the probing slave mode provides the acknowledgment (ACK).

6. The system according to claim 1, wherein the system comprises a controlling entity (SCT) arranged to register a malfunction in case the first object detection module (ODM) that operates in the probing master mode (PMM) and the second object detection module that operates in the probing slave mode (PSM) have been registered as neighbors, and the second object detection module that operates in the probing slave mode does not provide a second acknowledgment (ACK).

7. The system according to claim 1, wherein the system is arranged to cause the first object detection module (ODM) to operate in the probing master mode (PMM) and to cause the second object detection modules to operate in the probing slave mode (PSM) during regular intervals of time.

8. The system according to claim 1, wherein the system is arranged to cause respective ones of the plurality of object detection modules, including said first object detection module, to operate in the probing master mode (PMM) during respective intervals of time, and to cause respective other ones of the plurality of object detection modules, including said second object detection module, to operate in the probing slave mode (PSM).

9. The system according to claim 8, wherein a controlling entity is arranged to determine a topology of the plurality of object detection modules on the basis of said acknowledgement and other respective acknowledgments (ACK) that have been reported during the respective intervals of time.

10. The system according to claim 1, wherein respective the first and second object detection modules (ODM) are associated with respective communication modules (CIF), the communication module that is associated with the first object detection module being configured to transfer a message to the communication module that is associated with the second object detection module as long as the second object detection module provides the acknowledgment (ACK) in response to the probing radiation (PR) from the first object detection module, and otherwise transfer a message to a neighboring third communication module that is associated with a neighboring third object detection module of said plurality of object detection modules that does provide a respective second acknowledgment in response in the probing radiation of the first object detection module.

11. The system according to claim 1, wherein the second object detection module is arranged to include said identification data (ID) in the acknowledgement.

12. The system according to claim 1, wherein the second object detection module is arranged to provide the acknowledgment via a communication interface (CIF) that is distinct from the first object detection module.

13. An object detection module (ODM), the object detection module being a first object detection module that is arranged to operate in a standard mode in which the first object detection module can detect an object from a radiation in a particular wavelength range and carry out a control depending on detection of the object, the first object detection module being arranged to operate in a probing master mode (PMM) in which the first object detection module produces a probing radiation (PR) in the particular wavelength range, wherein the first object detection module (ODM) is configured to associate identification data of a second object detection module with a direction in which said second object detection module is disposed based on an acknowledgement received from said second object detection module in response to said probing radiation.

14. A method of operating a system comprising a plurality of object detection modules, at least a first object detection module (ODM) of said plurality of object detection modules being arranged to operate in a standard mode in which the first object detection module can detect an object from a radiation in a particular wavelength range and carry out a control depending on detection of the object, the method comprising:

a probing phase in which the first object detection module is caused to operate in a probing master mode (PMM) in which the first object detection module produces a probing radiation (PR) in the particular wavelength range, and in which at least a second object detection module of said plurality of object detection modules is caused to operate in a probing slave mode (PSM) in which the second object detection module provides an acknowledgment (ACK) in response to receiving the probing radiation, wherein, during said probing phase, the first object detection module (ODM) that operates in the probing master mode (PMM) associates identification data of said second object detection module with a direction in which said second object detection module is disposed based on said acknowledgement.

15. A computer program product comprising a set of instructions that enables a processor, which is capable of executing the set of instructions, to carry out the method according to claim 14.

\* \* \* \* \*